United States Patent [19]
Noneman

[11] Patent Number: 5,887,252
[45] Date of Patent: Mar. 23, 1999

[54] MULTICAST TRANSMISSION FOR DS-CDMA CELLULAR TELEPHONES

[75] Inventor: John Noneman, Valley Center, Calif.

[73] Assignee: Nokia Mobile Phones Limited, Salo, Finland

[21] Appl. No.: 711,528

[22] Filed: Sep. 10, 1996

[51] Int. Cl.[6] ..................................................... H04Q 7/20
[52] U.S. Cl. .......................... 455/414; 455/557; 455/566; 370/312; 370/335; 375/208
[58] Field of Search .................... 455/414, 566, 455/550, 524, 503, 526, 458, 517, 502, 557; 370/320, 335, 342, 441, 479, 312; 375/206, 208, 209, 210

[56] References Cited

U.S. PATENT DOCUMENTS

| | | |
|---|---|---|
| 5,187,810 | 2/1993 | Yoneyama et al. ...................... 455/524 |
| 5,396,653 | 3/1995 | Kivari et al. ............................... 455/88 |
| 5,430,740 | 7/1995 | Kivari et al. .......................... 371/37.08 |
| 5,491,718 | 2/1996 | Gould et al. ............................. 375/205 |
| 5,570,353 | 10/1996 | Keskitalo et al. ....................... 370/335 |
| 5,577,024 | 11/1996 | Malkamaki et al. .................... 370/335 |
| 5,583,866 | 12/1996 | Vook et al. .............................. 455/502 |
| 5,606,548 | 2/1997 | Vayrynen et al. ....................... 370/252 |
| 5,708,656 | 1/1998 | Noneman et al. ....................... 370/320 |
| 5,726,981 | 3/1998 | Ylitervo et al. ......................... 370/332 |
| 5,745,503 | 4/1998 | Kuusinen ............................. 371/37.01 |
| 5,764,632 | 6/1998 | Ylitervo .................................. 370/337 |

*Primary Examiner*—Andrew M. Dolinar
*Attorney, Agent, or Firm*—Perman & Green, LLP

[57] ABSTRACT

Multicast transmission for DS-CDMA cellular communication wherein a mobile station requests a multicast service by use of a service option and a base station transmits to the mobile station a long code mask and code channel needed to receive the multicast service. No reverse channel is used so that an unlimited number of terminals may receive the multicast service.

10 Claims, 2 Drawing Sheets

MULTICAST TRANSMISSION FOR DS-CDMA CELLULAR TELEPHONES

BACKGROUND OF THE INVENTION

1. Field of the invention

This invention relates to cellular telephones, specifically to a method of multicast transmission for a direct sequence code division multiple access cellular telephone system.

2. Prior Art

Cellular telephone networks are commonly used for wireless two-way communication between a mobile station and a base station. Many base stations are interconnected to form a network. The base stations are connected to the land-line telephone network so the mobile stations may communicate with land-line telephones or other cellular telephones.

In a direct sequence code division multiple access (DS-CDMA) cellular system the communication between a mobile station (MS) and a base station (BS) is digital information. An example of a DS-CDMA cellular system is described in the TIA/EIA/IS-95A standard. In an IS-95A type system, the digital information may be data or compressed digitized voice. A BS normally will communicate over the forward link with more than one MS at a time by spreading the digital information with a unique spreading code assigned to each MS communicating on a common frequency. The digital information is also scrambled with a unique long code prior to spreading. A particular MS will only receive the information spread with its assigned spreading code and ignore the information transmitted to another MS. The information spread with other spreading codes appears as background noise and reduces the signal to noise ratio. Although a MS can receive information spread on any code channel it will be unable to descramble the information without knowing the long code used to scramble the data.

FIG. 1 is a block diagram of the signal processing in the forward link of a DS-CDMA receiver according to IS-95A. Long code generator 100 generates a pseudo random code used by adder 110 to scramble data. The long code is a serial bit pattern that is sequenced at a rate equal to the data rate being scrambled so there is no spectrum spreading. The long code is the modulo-2 inner product of a long code mask and the state vector of a sequence generator. A 64 bit Walsh code sequence is generated at the transmitted chip rate by Walsh code generator 120 and applied to adder 130 which achieves spectrum spreading.

Several frequency channels are used in each cell. Each forward link frequency channel uses a maximum of 64 spreading codes selected from a set of 64 orthogonal Walsh codes. The spreading code, scrambling code, and frequency channel are assigned to each MS as part of the service negotiation that occurs when a call is originated by the MS or is received by the MS.

Transmission of the same data or voice information to multiple MS is not directly supported by the IS-95A specification. It can be done by spreading the information with a different spreading code assigned to each MS intended to receive the transmission. Accordingly, the transmission to each MS requires one of the available 64 spreading codes. With each additional signal that is transmitted available system capacity is used as the signal to noise ratio is reduced.

It is impractical to transmit data or voice information to a large number of users because of the impact on system capacity. System capacity is limited by a number of factors including signal to noise ratio and the number of available spreading codes. Multicast transmission according to the prior art has the disadvantage of consuming an excessive amount of system capacity and being limited by the number of available spreading codes.

IS-95A type DS-CDMA uses frequency duplexing to separate the forward and reverse link. Communication from the BS to MS occurs on a forward link at one frequency, and communication from MS to BS occurs on a reverse link at another frequency. Simultaneous transmission occurs on both links. Additional signal traffic on either link increases the noise of that link, thus requiring higher transmission power to achieve an acceptable signal-to-noise ratio. When no information is transmitted on the reverse link, a low rate signal is still transmitted by the MS to maintain the synchronization of the BS receiver. This adds traffic and therefore reduces available system capacity. Capacity of the reverse link is generally the limiting factor in overall system capacity, so it is important to avoid unnecessary signal transmission on the reverse link.

If information is to be multicast to several mobile stations, a forward link is needed for the information. A reverse link is not normally needed because a multicast is a receive-only signal. According to the prior art a reverse link is still used, even though not needed. This causes the MS receiving the multicast to transmit a signal that is unnecessary and wasteful of battery power. The added signals on the reverse link also adds noise and requires other MS which are in two-way communication on that frequency channel to transmit at a higher power level. Multicast according to the prior art thus has the disadvantage of causing unnecessary signal transmission, wasting system capacity, and consuming excess battery power in the mobile stations receiving the multicast as well as mobile stations not receiving the multicast.

Conventional implementation of CDMA cellular communication as specified in IS-95A does not allow for efficient multicast transmission. An improved method of multicast transmitting is needed to efficiently transmit the same information to many mobile stations without limiting available system capacity and wasting battery power.

SUMMARY OF THE INVENTION

This invention is directed to solving the problem of inefficient multicast transmission. According to the invention, a spreading code and scrambling code are assigned to each multicast service. During service negotiation the mobile station may transmit a request to the base station for a specific multicast service. The base station transmits to the mobile station the spreading code and scrambling code being used for that multicast service. The mobile station then receives the signal on the forward link using the assigned spreading code and does not transmit a response on the reverse link. Accordingly, the method of this invention has the advantage of using a single spreading code for each multicast service regardless of the number of mobile stations receiving the signal. Additionally, the reverse link is not used so there is no impact on the reverse link capacity.

In an embodiment of the invention, the MS uses the SPECIAL_SERVICE field and SERVICE_OPTION field of the conventional Origination Message to request a multicast service. According to the invention a unique service option number is assigned to all multicast services. After receiving the multicast service request and validating that the MS is authorized to receive the multicast service, the BS transmits an Extended Hand-off Direction Message to the MS specifying the spreading code and scrambling code used for the desired multicast service.

A multicast service may be available as a paid service or for free. An MS transmits identification information, for example the phone number of the MS and electronic serial number, when service negotiation occurs. In the case of a paid service, the network can deny access to a requested multicast service if the MS does not have an active subscription to that service.

Information received by the MS from the multicast service can be used in many ways. Depending on the service and the nature of the information, it may be used internally in the MS unknown to the user, displayed on the display of the MS, or the MS may be connected to an external device such as a personal computer. In a personal computer application, the information could be processed by software, then displayed on the screen of the computer.

An object of the invention is to provide a method of multicast transmitting the same information to a plurality of users.

Another object of the invention is to provide a method of multicast transmission in which the available capacity of the network is maximized.

Another object of the invention is to provide a method of multicast transmission in which the power consumption of the mobile station is minimized.

Another object of the invention is to provide a method of multicast transmission in which only mobile stations with a subscription to a multicast service are able to receive the multicast information.

Another object of the invention is to provide a method of multicast transmission which is compatible with existing DS-CDMA cellular systems.

A feature of the invention is that each multicast service uses only one code channel regardless of the number of mobile stations receiving the signal.

Another feature of the invention is to allow the mobile station to operate on the forward link in a receive only mode and not engage in continuous transmission on the reverse link.

Another feature of the invention is the unique assignment of a service code for each multicast service to allow the multicast service to be selected by a user.

Another feature of the invention is the assignment of a unique long code mask to each multicast service which is used to scramble the data and prevent unauthorized mobile stations from receiving the data.

Another feature of the invention is the negotiation of multicast service uses extensions to existing defined messages.

An advantage of the invention is that information may be multicast to an unlimited number of mobile station users within each cell while using a fixed amount of system capacity, independent of the number of users.

Another advantage of the invention is that no reverse channel capacity is used while the mobile stations are receiving the multicast information.

Another advantage of the invention is that battery life of the mobile station is extended when receiving a multicast service because no reverse link transmission is required.

Another advantage of the invention is that other mobile stations in the same cell which are not receiving the multicast service are not impacted by the multicast service because the reverse link signal traffic is unaffected by the presence of the multicast service.

Another advantage of the invention is that compatibility with mobile stations and base stations not supporting multicast service is maintained, and a minimal change is made to existing message structures.

These and other advantages and features of the invention will become more apparent from the following description of an embodiment considered together with the drawings.

DETAILED DESCRIPTION OF A PREFERRED EMBODIMENT

Figure 2:
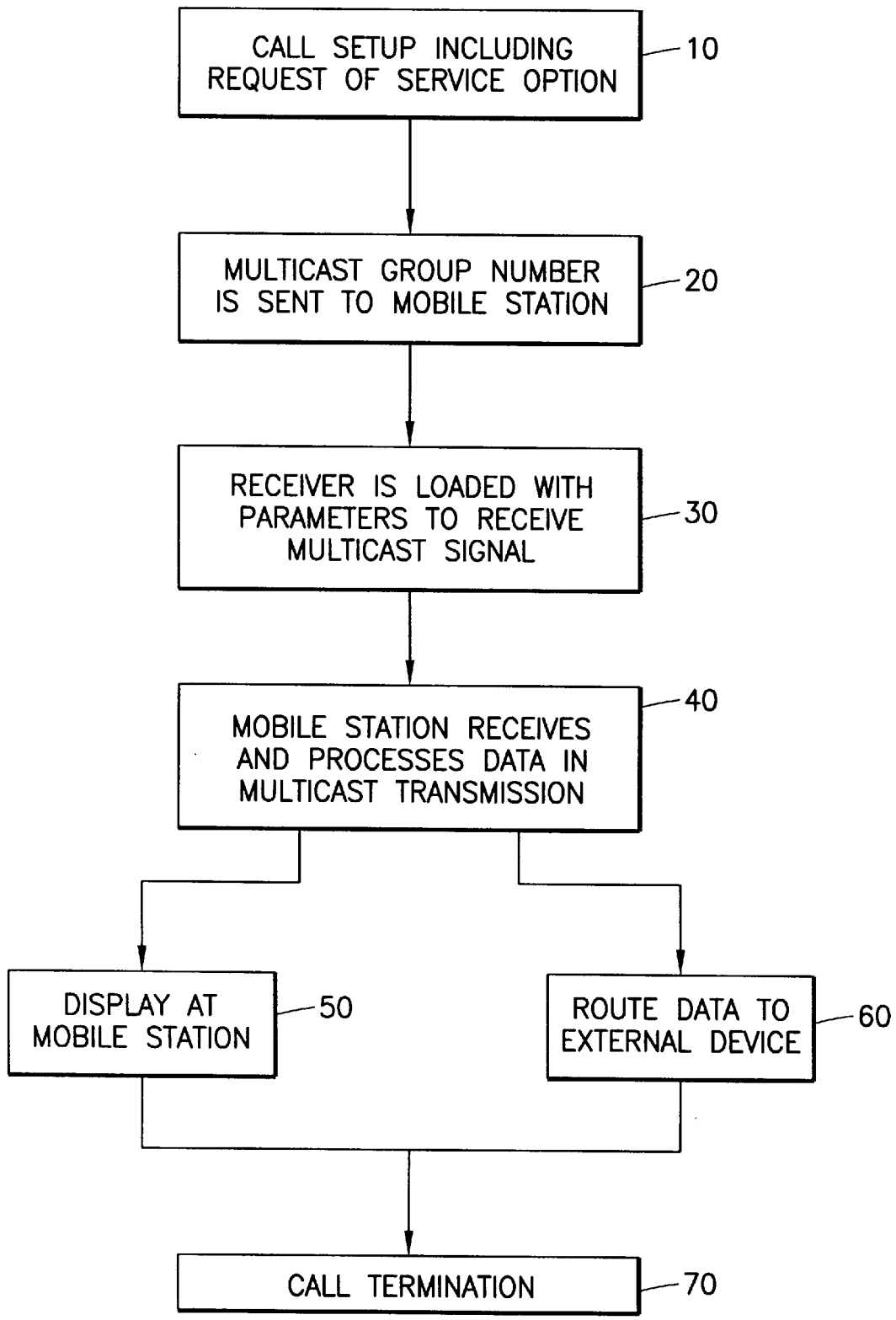
FIG. 2 shows a flow chart of a mobile station originated multicast service negotiation according to the present invention.

FIG. 2 shows the steps taken to connect a mobile station to a multicast service. Reference can be had to, by example, FIG. 2 of commonly assigned U.S. Pat. No. 5,491,718 for showing in block diagram form a suitable embodiment of mobile station receiver circuitry. The disclosure of U.S. Pat. No. 5,491,718 is incorporated by reference herein. Call set up 10 comprises the steps taken by the MS to originate a call. The call set up is done in the conventional manner. An Origination Message defined in section 6.7.1.3.2.4 of IS-95A, a portion of which is shown in Table 1, is transmitted from the MS to the BS on an access channel. Included in the origination message is a SPECIAL_SERVICE indicator field and an associated SERVICE_OPTION field to hold the numeric value of the service option requested. When the SPECIAL_SERVICE field is set to 1 the SERVICE_OPTION field will hold a 16 bit value. A particular multicast service will be assigned a unique service option number. Service option numbers are defined in TIA/EIA/IS-58 which is revised occasionally to incorporate new service options.

TABLE 1

| PORTION OF ORIGINATION MESSAGE | |
|---|---|
| Field Name | Length (bits) |
| SPECIAL_SERVICE | 1 |
| SERVICE_OPTION | 0 or 16 |

The Origination Message structure, in accordance with an aspect of this invention, is not altered. The value of the service option indicates the new multicast service. If a base station that does not support multicast service receives a request from a mobile station for multicast service, it will result in the base station ignoring the request with no effect on the base station. Compatibility with base stations not supporting multicast service is thus maintained.

The MS is assigned to a temporary traffic channel in the conventional manner in order to complete the service negotiation and receive the multicast service parameters from the base station.

Referring again to FIG. 2, step 20, upon receiving the origination message containing a service option corresponding to a multicast service, and assigning the MS to a temporary traffic channel, the BS can send multicast service parameters using, for example, an Extended Handoff Direction Message (EHDM) defined in section 7.7.3.3.2.17 of IS-95A. Table 2 shows the message fields added to the EHDM according to the present invention to enable the MS to receive the multicast information. The additional fields are MULTICAST_ACTIVE and MULTICAST_GROUP for specifying the long code mask used by the MS to receive the multicast information. When MULTICAST_ACTIVE is set to 1, a 42 bit MULTICAST_GROUP will be the next field.

TABLE 2

ADDITIONS TO EHD Message

| Field Name | Length (bits) |
| --- | --- |
| MULTICAST_ACTIVE | 1 |
| MULTICAST_GROUP | 0 or 42 |

These additional fields can be incorporated into an EHDM with their presence indicated by the use of a specific bit pattern in the RESERVED field already defined for an EHDM. An Origination Message requesting multicast service will only be sent by a mobile station supporting multicast reception, and thus the mobile station will be capable of receiving the modified EHDM.

The EHDM as defined in the prior art contains a CODE_CHAN field to specify the code channel index that the MS is to use on the forward traffic channel. The channel is the same channel that the BS will use, in accordance with this invention, when transmitting the multicast information and corresponds to the Walsh code index used for spreading the data signal.

After receiving the EHDM containing the multicast parameters, the temporary traffic channel can be released.

The use of an Origination Message a nd EHDM message is by way of example other reverse channel messages can be used to request the multicast service. Other forward channel message types could be used to transmit the multicast group information to the mobile station. New messages can be defined to accomplish the same objectives.

In step 30 the MS sets up the CDMA receiver to receive the specified Walsh channel and descramble same using along code generated with the long code mask contained in the MULTICAST_GROUP field. The multicast information is available at the output of the CDMA receiver in step 40 and can be routed to the MS display in step 50 or through a baseband data connection to an external device, such as a personal computer, in step 60, or both.

Step 70 is the call termination. A multicast reception can be terminated using a conventional call termination sequence, or the MS may simply stop receiving the signal.

Although the preceding description is for a mobile or ignited call, the multicast method of this invention can be used for a mobile terminated call also. In the example of a mobile terminated call, the base station initiates the call to a mobile. A multicast service would be specified in an EHDM in the same manner as described for a mobile originated call. A mobile terminated multicast transmission could be used when the network needs to broadcast information to many mobile stations in the cell, even though the user of the mobile station did not request any multicast service.

Figure 1:
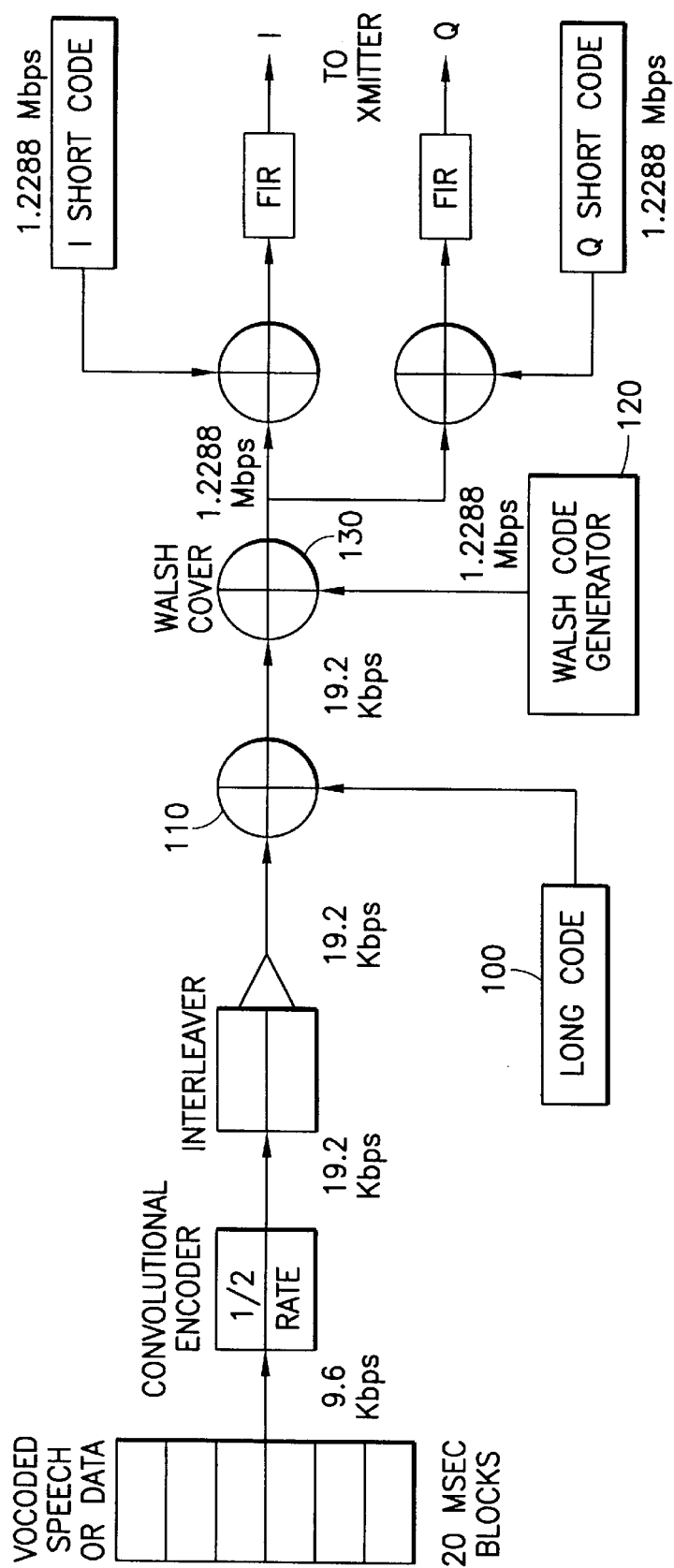
FIG. 1 is a block diagram of the forward link (base station to mobile station) signal processing in a DS-CDMA system.
Figure 3:
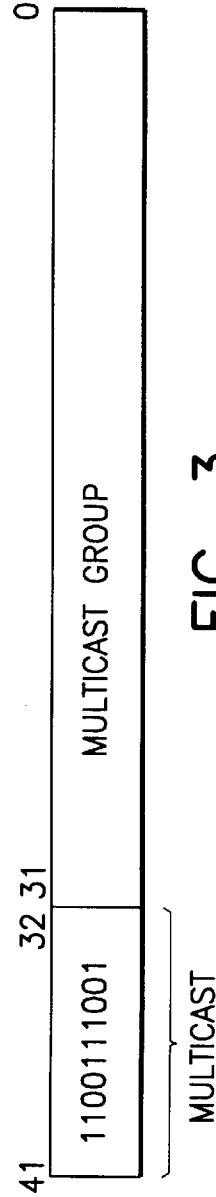
FIG. 3 shows an example of a multicast group long code mask according to the present invention.

FIG. 3 is an example of a multicast group long code mask. Bits 32 to 41 are used to indicate the long code mask is for a multicast signal. This pattern can be same for all multicast long code masks. The bits are selected to be unique and different from the patterns used for the public long code mask, private long code mask, and other long code masks already defined in IS-95A. The particular bit pattern is not critical. Bits 0 to 31 are the bit pattern for the particular multicast and would be different for each multicast service. The multicast long code is used to scramble the data at the transmitter in the BS and used by the receiver in the MS to descramble the data.

The BS is made aware of the identity of the MS requesting a multicast service from the information transmitted in the Origination message during call set up. By structuring the method to include transmitting the multicast long code mask value to the MS, instead of pre-storing it in the MS, the network can control access to the multicast information. If the service is restricted to certain users, such as users which have purchased a subscription to the service, only validated subscribers will be sent the multicast long code mask. The network may also change the multicast long code mask for any multicast service without changing the multicast service option number thereby avoiding any impact on mobile stations.

The service option number corresponding to each multicast service a user wishes to receive is programmed into the MS. This is done so the service option number can be sent in an Origination Message. The service option numbers can be programmed into the MS by a number of techniques, for example using menu structures built into the MS user interface or other key press sequences on the MS. Another menu option can provide for the selection of a multicast service from a list of programmed multicast services prior to initiating a call.

Although described in the context of presently preferred embodiments, it should be understood that various modifications to these embodiments can be made, and that these modifications will fall within the scope of the following claims.

What is claimed is:

1. A method of multicast transmission from a base station to a mobile station comprising the steps of:
   originating a call;
   transmitting multicast service parameters to the mobile station, the multicast service parameters comprising a code channel and a long code mask;
   transmitting data from the base station using the multicast service parameters; and
   receiving in the mobile station the multicast transmission using the multicast service parameters.

2. The method of claim 1 wherein the step of originating a call comprises the further step in which a multicast service is requested by the mobile station.

3. The method of claim 1 wherein the step of originating a call comprises a step in which the multicast service is determined in the base station and communicated to the mobile station.

4. The method of claim 1 comprising the further step of displaying the information contained in the multicast transmission on a display of the mobile station.

5. The method of claim 1 comprising the further step of communicating the information contained in the multicast transmission to a device external to the mobile station.

6. The method of claim 1 comprising the further step of inhibiting reverse link signal transmission from the mobile station.

7. A method of multicast transmission from a base station to a mobile station comprising the steps of:
   originating a call;

transmitting multicast service parameters to the mobile station, the multicast service parameters comprising a spreading code and a long code mask; and transmitting data from the base station using the multicast service parameters.

8. A method of multicast transmission from a base station to a mobile station comprising the steps of:

originating a call wherein a multicast service is requested;

receiving multicast service parameters in the mobile station, the multicast service parameters comprising a spreading code and a scrambling code; and receiving in the mobile station the data transmitted by the base station, the mobile station using the multicast service parameters.

9. A cellular telephone mobile station for receiving a multicast transmission comprising:

means for originating a cellular telephone call;

means for receiving multicast parameters transmitted by a base station, the multicast parameters comprising a spreading code and a scrambling code; and receiving means adapted to accept said multicast parameters;

said receiving means further adapted to receive a multicast signal transmitted by said base station using said multicast parameters.

10. A cellular telephone base station for transmitting a multicast transmission comprising:

means for originating a cellular telephone call;

means for transmitting multicast parameters to a mobile station, the multicast parameters comprising a spreading code and a scrambling code; and means for transmitting a multicast signal using said multicast parameters.

* * * * *